April 19, 1960 E. BACKHAUS, JR 2,933,351
ENDLESS TRACK
Filed Feb. 19, 1958 2 Sheets-Sheet 1

INVENTOR
ERWIN BACKHAUS, JR.
BY Dick and Craig
ATTORNEYS

April 19, 1960   E. BACKHAUS, JR   2,933,351
ENDLESS TRACK
Filed Feb. 19, 1958   2 Sheets-Sheet 2

INVENTOR
ERWIN BACKHAUS, JR.
BY Dicke and Craig
ATTORNEYS

United States Patent Office 2,933,351
Patented Apr. 19, 1960

2,933,351

ENDLESS TRACK

Erwin Backhaus, Jr., Remscheid, Germany, assignor to Firma Erwin Backhaus, Remscheid, Germany Application February 19, 1958, Serial No. 716,054

Claims priority, application Germany March 9, 1957

4 Claims. (Cl. 305—10)

The present invention relates to improvements in endless tracks, and more particularly to an endless track with a rubber layer at one or both sides of its links.

The supporting structure of such track links usually consists of two spaced goggle-shaped end portions and a pair of tubular members connecting these end portions to each other, thus forming a double-tubular unit which is provided with a rubber covering either only at the inner side of the track or both at the inner side and at the outer side forming the tread surface.

The endless tracks of this known design have the serious disadvantage that the double-tubular units forming the supporting structure of each track link are composed of a plurality of individual elements, namely, the two goggle-shaped end portions and the tubular members connecting the same, and that the tubular members are brazed into the end portions. Such brazed joints have a relatively low tensile strength and they are rather unreliable since the tubes are fitted tightly into the goggle-shaped end portions whereby the flux may be scraped off the tubes and the soldering material may not uniformly cover all portions of the joint. Since there is no possibility of determining whether or not such a joint is securely brazed, the large tubular portions of such units cannot be utilized as supporting surfaces to give the track the necessary tensile strength, but the entire load must be taken up by the relatively thin goggle-shaped end portions. Since the dimensions of the goggle-shaped end portions are dependent upon the gears of the endless track vehicle, and since it is also impossible to reduce the wall strength of the rubber covering in order to increase the outer dimensions of the tubular members, the effective tensile strength of such endless tracks is directly dependent upon the tensile strength of these end portions, that is, upon the weakest portions of the entire track.

It is an object of the present invention to provide an endless track of a much greater tensile strength than was hitherto possible. This object is attained according to the invention by making the two goggle-shaped end portions and the two tubular members connecting the same of one integral piece of cast or forged steel, that is, of a single casting or forging which is suitably tempered. The supporting cross-sectional area of the goggle-shaped end portions will thus be enlarged by that of the walls of the tubes. By making the entire double-tubular unit of one piece, a further disadvantage of the prior brazed units will be overcome that, when the rubber remnants are burned off the unit for applying a new layer of rubber thereon, the brazed joints might become unsoldered, or that at least the improperly brazed points will increase in size.

According to another feature of the present invention, the guide skids or spurs which are intermittently spaced along the tread surface of the track and are normally subjected to excessive wear are face-hardened by a gas-carburizing or similar treatment so that the temper extends to a depth of about 2 to 3 mm. into the material of the skids. By only hardening the outside of the skids, the wear thereon will be considerably reduced, while the tenacity thereof will remain unaffected. Thus, the track will last a much longer time without reduction in tensile strength.

Further objects, features, and advantages of the present invention will appear from the following detailed description thereof, particularly when read with reference to the accompanying drawings, in which—

Fig. 7 shows a cross section taken along line 7—7 of Fig. 6, with the rubber layer indicated in dot-and-dash lines; while

Figure 1:
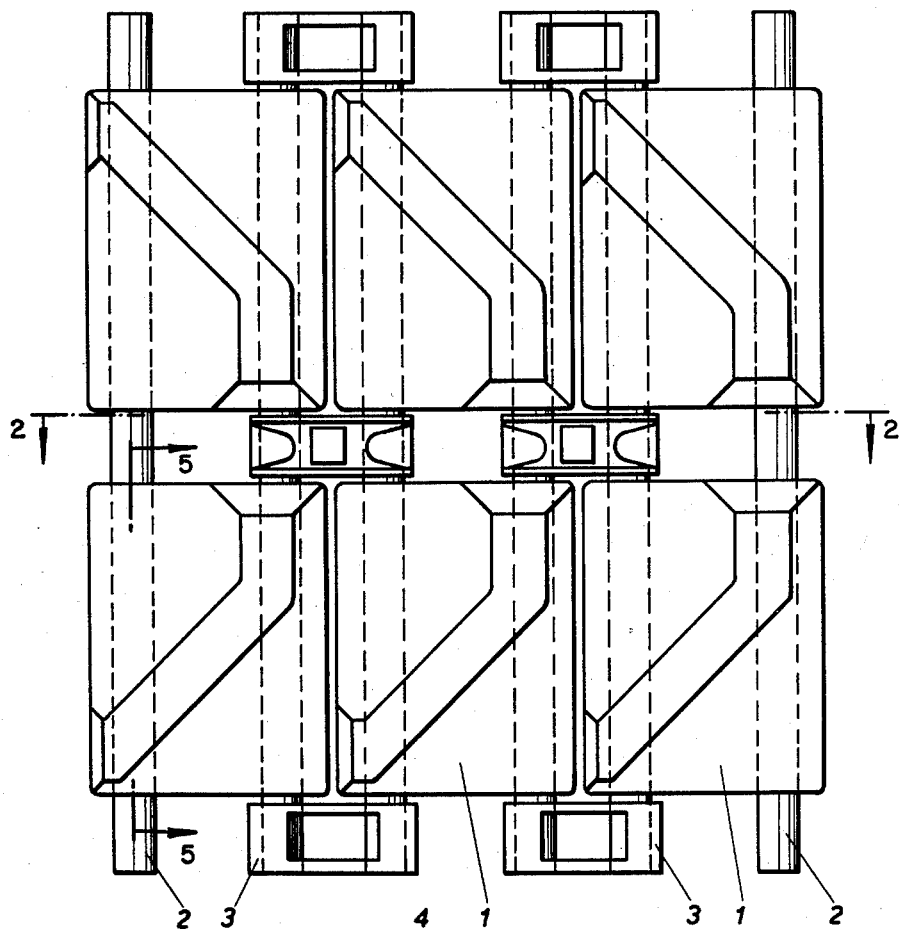
Fig. 1 shows a plan view of a section of the track according to the invention which is provided with a rubber layer on both its upper and lower sides.
Figure 2:
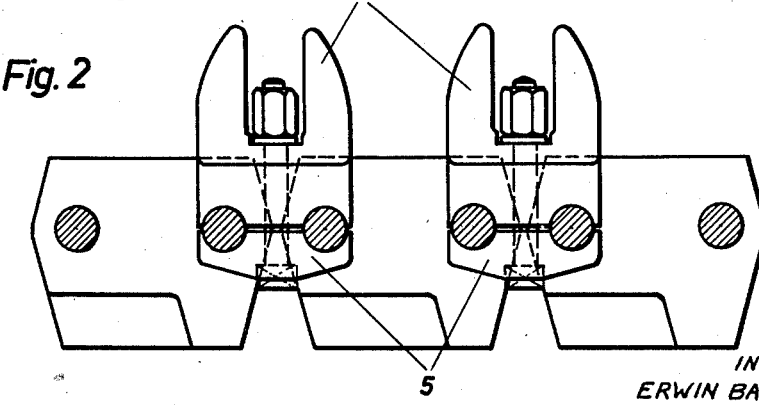
Fig. 2 shows a side view of the track section viewed in the direction 2—2 of Fig. 1.

Referring to the drawings, the individual links 1 of the endless track according to the invention, which in Figs. 1 and 2 are illustrated with a rubber tread on both sides thereof, are connected to each other by coupling bolts 2 and connecting members 3 which are fitted over their ends so as to form an endless chain. Between the individual track links, bolts 2 carry guide skids 4, each of which is bolted on two adjacent bolts 2 by means of a connecting member 5, although they may also be cast onto the tubular members as subsequently described.

Figure 3:
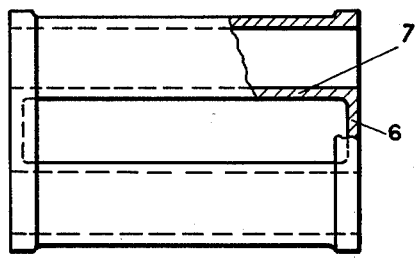
Fig. 3 shows a plan view, partly in cross section, of the double-tubular supporting unit.
Figure 4:
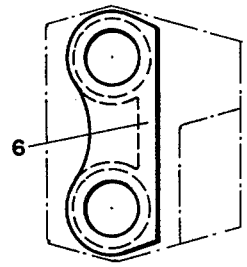
Fig. 4 shows an end view of the unit as illustrated in Fig. 3.
Figure 5:
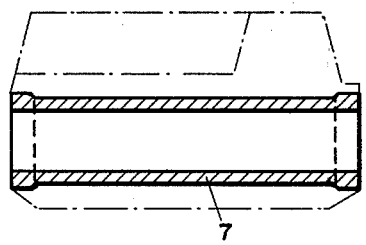
Fig. 5 shows a longitudinal cross section taken along line 5—5 of Figure 1 of one of the tubular members of the unit, with the rubber layer thereon indicated in dot-and-dash lines.
Figure 6:
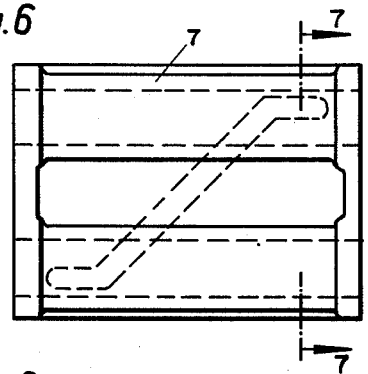
Fig. 6 shows a plan view of a double-tubular unit with a rubber layer only on the upper side which runs along the bogie wheels of the caterpillar vehicle.
Figure 7:
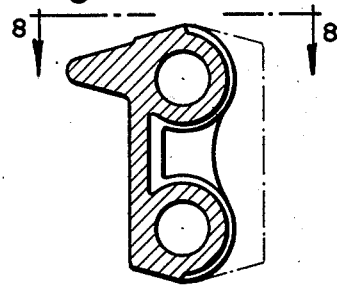
Figure 8:
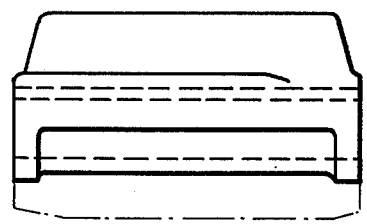
Fig. 8 shows a side view of the one-layer unit viewed in the direction 8—8 of Figure 7.

The supporting structure of each link 1 is formed of a double-tubular unit as illustrated in Figs. 3 to 5 which consists of two goggle-shaped end portions 6 which are connected to each other by tubular members 7. Members 6 and 7 consist of cast or forged steel and are made in one piece and tempered so that the tensile load on the track will be taken up equally by the walls of the tubular members 7 and those of the goggle-shaped end portions 6. As usual in endless tracks, coupling bolts 2 are mounted in the tubular members 7 by means of rubber rings. As previously stated, the rubber layer may be provided either on both sides of the tubular unit as shown in Figs. 3 to 5 or only on the insides thereof, as shown in Figs. 6 to 8, which are in engagement with the bogie wheels of the endless track vehicle, in which case the tubular steel members themselves form the tread surface which runs along the road.

The guide surfaces of guide skids 4, 5 of the track are preferably face-hardened by a gas-carburizing or similar treatment to a depth of about 2 to 3 mm. so as to protect them from wear as much as possible.

Instead of being cast in one piece of steel, the tubular units may also be integrally cast of any other suitable material or be made in any other suitable manner to form a single unitary element.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An endless track comprising a plurality of links, each of said links comprising a pair of tubular members, means for connecting said tubular members to each other including a substantially goggle-shaped end portion for connecting the ends of said tubular members with each other and a bridge portion connecting said tubular members with each other along the entire length thereof, said bridge portion extending substantially tangentially with respect to the contour of said tubular members, said tubular members, said bridge portion and said end portions of each link being cast of one piece of a hard metallic material so as to form an integral unit, a rubber layer secured to at least one side of said unit, connecting bolts extending through said tubular members, and connecting members on the outer ends of each bolt for connecting the bolts of adjacent links to each other.

2. An endless track as defined in claim 1, further comprising guide skids secured to each of said links and disposed substantially intermediate adjacent links, said skids being face-hardened to a depth of 2 to 3 mm.

3. An endless track as defined in claim 2, wherein said guide skids are cast integral with said tubular members.

4. An endless track as defined in claim 1, wherein said tubular members, said bridge portion and said end portions of each link are forged of one piece of steel and tempered.

References Cited in the file of this patent

UNITED STATES PATENTS

| | | |
|---|---|---|
| 1,949,423 | Knox et al. | Mar. 6, 1934 |
| 2,015,683 | Knox et al. | Oct. 1, 1935 |
| 2,089,210 | Knox et al. | Aug. 10, 1937 |
| 2,375,170 | McNeil | May 1, 1945 |
| 2,422,483 | Haushalter | June 17, 1947 |
| 2,430,354 | Matheny et al. | Nov. 4, 1947 |